United States Patent

Young

[11] Patent Number: 5,811,951
[45] Date of Patent: Sep. 22, 1998

[54] HIGH PRECISION REDUNDANT ROBOTIC MANIPULATOR

[75] Inventor: Kar-Keung David Young, Mountain View, Calif.

[73] Assignee: Regents of the University of California, Oakland, Calif.

[21] Appl. No.: 734,423

[22] Filed: Oct. 14, 1996

[51] Int. Cl.⁶ .................. B25J 9/00; G05B 9/18
[52] U.S. Cl. .................. 318/568.2; 318/568.1; 901/8; 901/9; 901/42
[58] Field of Search .................. 318/568–632; 901/15, 17, 42, 20–34; 47/490.04, 490.01, 490.03; 395/99; 248/123.1, 280.1

[56] References Cited

U.S. PATENT DOCUMENTS

| | | | |
|---|---|---|---|
| Re. 33,466 | 12/1990 | Kato | 26/708 |
| 4,873,511 | 10/1989 | Tanaka | 340/677 |
| 4,906,907 | 3/1990 | Tsuchihashi et al. | 318/568.22 |
| 4,921,393 | 5/1990 | Andeen et al. | 414/729 |
| 4,931,617 | 6/1990 | Toyoda et al. | 219/125.1 |
| 4,970,448 | 11/1990 | Torii et al. | 313/568 |
| 5,000,653 | 3/1991 | Gosdowski | 414/744.5 |
| 5,046,915 | 9/1991 | Azuma et al. | 414/744.5 |
| 5,046,992 | 9/1991 | Tamai et al. | 474/84 |
| 5,102,289 | 4/1992 | Yokoshima et al. | 414/744.2 |
| 5,157,316 | 10/1992 | Glovier | 318/568.11 |
| 5,159,249 | 10/1992 | Megherbi | 318/568.1 |
| 5,220,261 | 6/1993 | Kempas | 318/567 |
| 5,245,263 | 9/1993 | Tsai et al. | 318/568.1 |
| 5,318,471 | 6/1994 | Glovier | 446/268 |
| 5,332,181 | 7/1994 | Schweizer et al. | 248/123.1 |
| 5,357,824 | 10/1994 | Hashimoto | 74/479 BP |
| 5,382,885 | 1/1995 | Salcudean et al. | 318/568.11 |
| 5,528,955 | 6/1996 | Hannaford et al. | 74/490.01 |
| 5,553,509 | 9/1996 | Somes | 74/89.2 |

Primary Examiner—Paul Ip
Attorney, Agent, or Firm—L. E. Carnahan; Henry P. Sartorio

[57] ABSTRACT

A high precision redundant robotic manipulator for overcoming contents imposed by obstacles or imposed by a highly congested work space. One embodiment of the manipulator has four degrees of freedom and another embodiment has seven degreed of freedom. Each of the embodiments utilize a first selective compliant assembly robot arm (SCARA) configuration to provide high stiffness in the vertical plane, a second SCARA configuration to provide high stiffness in the horizontal plane. The seven degree of freedom embodiment also utilizes kinematic redundancy to provide the capability of avoiding obstacles that lie between the base of the manipulator and the end effector or link of the manipulator. These additional three degrees of freedom are added at the wrist link of the manipulator to provide pitch, yaw and roll. The seven degrees of freedom embodiment uses one revolute point per degree of freedom. For each of the revolute joints, a harmonic gear coupled to an electric motor is introduced, and together with properly designed based servo controllers provide an end point repeatability of less than 10 microns.

19 Claims, 3 Drawing Sheets

HIGH PRECISION REDUNDANT ROBOTIC MANIPULATOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to robotic manipulators, particularly to redundant robotic manipulators to enable operation in congested work space, and more particularly to a kinematic redundant robotic manipulator which incorporates selective compliant assembly robot arms to provide stiffness in both the vertical and horizontal planes.

Kinematic redundancy is used in robotic manipulators to overcome constraints imposed by obstacles or by limited or congested work space. Also, a selective compliant assembly robot arm (SCARA) has been utilized to provide high stiffness in the horizontal plane of the robot's work space. For a compact manufacturing automation station with a substantial number of process equipment densely packed within the operational volume, robotic manipulators which provide both kinematic redundancy and selective compliance are critically needed. For example, for opto-electronics (OE) manufacturing automation, the requirements call for the handling of optical fibers, and its precise placement to within 10 microns.

This high degree of repeatability, coupled with the kinematic redundancy requirement has been accomplished by the present invention, thus filling the above-referenced need. The high precision redundant robotic manipulator of the present invention provides embodiments having four and seven degrees of freedom and utilizes kinematic redundancy and selective compliance in both the vertical and horizontal planes. The kinematic redundant manipulator is capable of operating in a highly congested work space and, for example, in a typical automation platform constrained to an approximate footprint of under 0.5 square meters.

SUMMARY OF THE INVENTION

It is an object of the present invention to provide a robotic manipulator.

A further object of the invention is to provide a high precision redundant robotic manipulator.

A further object of the invention is to provide a robotic manipulator having kinematic redundancy.

Another object of the invention is to provide a robotic manipulator with kinematic redundancy and selective compliance.

Another object of the invention is to provide a high precision redundant robotic manipulator with selective complaint assemblies to provide high stiffness in both the vertical plane and the horizontal plane.

Another object of the invention is to provide a robotic manipulator with four or seven degrees of freedom, and wherein the added three degrees provide pitch, yaw, and roll.

Another object of the invention is to provide a redundant robotic manipulator which uses one revolute joint per degree of freedom.

Other objects and advantages of the invention will become apparent from the following description and accompanying drawings. The present invention is directed to a high precision redundant robotic manipulator. One embodiment provides four degrees of freedom while another embodiment provides seven degrees of freedom. Each embodiment incorporates selective compliant assemblies to provide high stiffness in both the vertical and the horizontal planes, as well as introducing kinematic redundancy into the manipulator to provide the capability of avoiding obstacles that lie between the base and the end effector of the manipulator. The additional three degrees of freedom in the seven degree embodiment are added at the wrist of the manipulator to provide pitch, yaw and roll degrees of freedom to the manipulated object. Also, the seven degree embodiment uses one revolute joint per degree of freedom. For each of the revolute joints, a harmonic gear coupled to an electric motor is utilized, and together with properly designed DSP based servo controllers the end point of the manipulator is provided with repeatability of less than 10 microns.

BRIEF DESCRIPTION OF THE DRAWINGS

The accompanying drawings, which are incorporated into and form a part of the disclosure illustrate embodiments of the invention and, together with the description, serve to explain the principles of the invention.

DETAILED DESCRIPTION OF THE INVENTION

Figure 1:
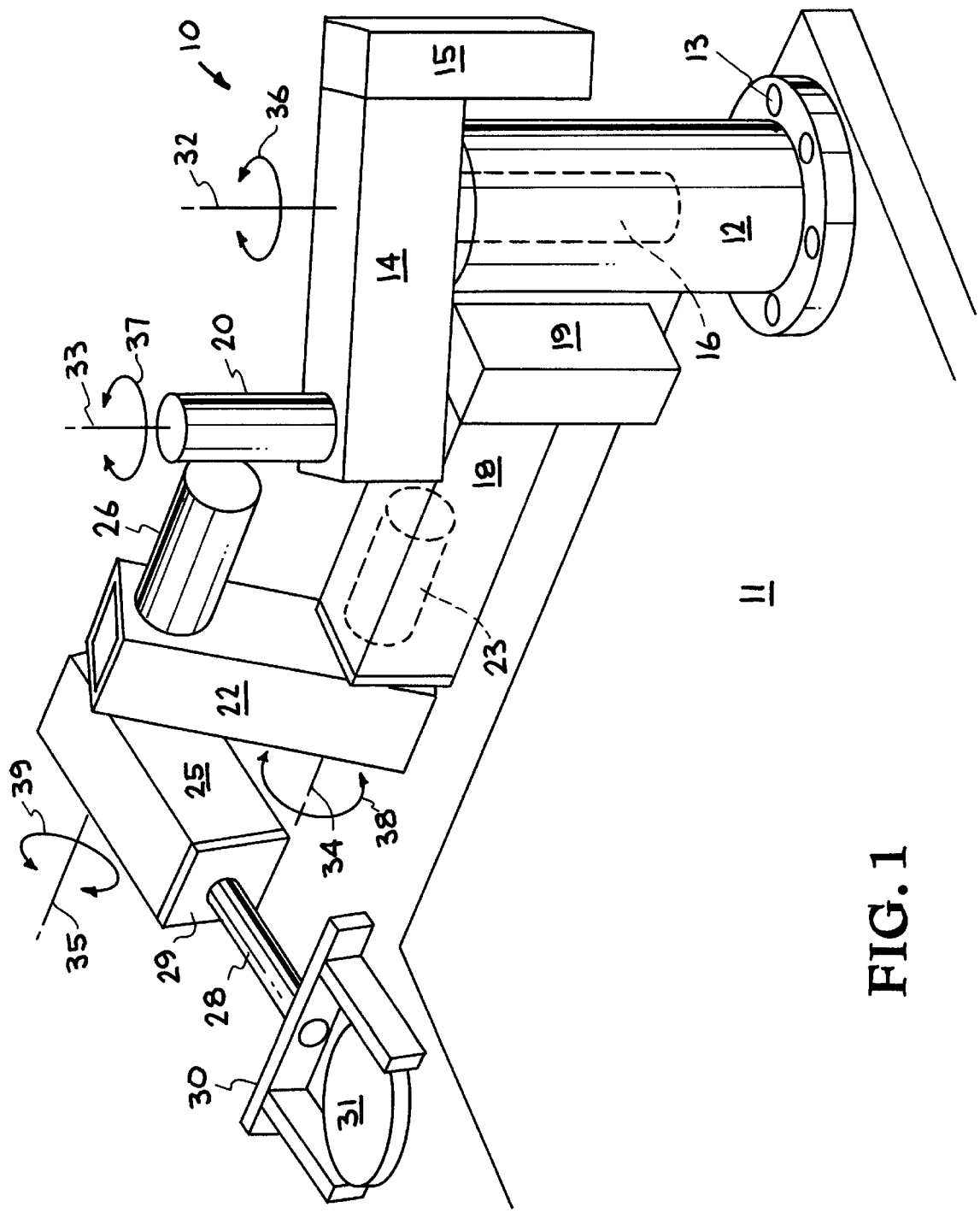
FIG. 1 is a perspective view of an embodiment of the invention involving four degrees of freedom.

The invention involves a high precision redundant robotic manipulator. Kinematic redundancy is used in robotic manipulator design to overcome constraints imposed by obstacles in path planning. A selective compliant assembly robot arm (SCARA) configuration has been previously used to provide high stiffness in the vertical plane of the robot's work space. The present invention combines kinematic redundancy and high stiffness in the vertical plane using a first selective compliant assembly, and additionally utilize a second selective compliant assembly to provide high stiffness in the horizontal plane. The invention is described utilizing an embodiment having four (4) degrees of freedom, and an embodiment having seven (7) degrees of freedom, with the added three degrees being added to the wrist of the manipulator to provide pitch, yaw, and roll.

For opto-electronic (OE) manufacturing automation, for example, the requirements call for the handling of optical fibers, and its precise placement to within 10 microns. This high degree of repeatability, coupled with kinematic redundancy is provided by the seven degree of freedom embodiment of this invention. In this embodiment there is used one revolute joint per degree of freedom. For each of the revolute joints, a harmonic gear coupled to an electric motor is used, and together with properly designed servo controllers, the end point repeatability is less than 10 microns. Thus, this embodiment satisfies the above-referenced OE manufacturing automation requirements.

In the high precision redundant robotic manipulator of the present invention, a SCARA configuration is used in the first two links to provide high stiffness in the vertical plane, and another SCARA configuration is used in the subsequent two links to provide high stiffness in the horizontal plane, as well as using kinematic redundancy in the manipulator to provide the capability of avoiding obstacles that lie between the base and the end effector of the manipulator. This results in one additional kinematic degree of freedom to position the end point of the fourth link which serves as the wrist, making the manipulator kinematically redundant. An additional three degrees of freedom are added at the wrist in the seven degree embodiment to provide pitch, yaw, and roll degrees of freedom to the manipulated object.

The high precision redundant manipulator is particularly applicable for use in micro scale manufacturing automation. The kinematic redundancy enables use in a highly congested work space as in a typical automation platform constrained to an approximate footprint of under 0.5 square meters. In a demonstration of the four degree of freedom embodiment, the redundant manipulator performed a repeated task of placing an optical fiber at a precise orientation to ±10 microns repeatability for a continuous time period of six hours. In a demonstration of the seven degree of freedom embodiment, an optical fiber of 200 microns in diameter was attached to the end effector, and repeatedly inserted into a hollow tube of 250 microns in diameter for several hours of three consecutive days.

Referring now to the drawings, the four (4) degree of freedom embodiment is illustrated in FIG. 1 and comprises a redundant robotic manipulator, generally indicated at 10, mounted on a base structure 11 via a support member or pillar 12 secured to base structure 11 by bolts 13, for example. A first link 14 having a counter balance 15 is rotatably mounted on top of pillar 12 and is connected to a motor 16 located within pillar 12 via a drive shaft 17, see FIG. 3. A second link 18 having a counter balance 19 is rotatably connected to a second motor 20 mounted on first link 14 via a drive shaft 21, see FIG. 3. The links 14 and 18 along with motor 20 and drive shaft 21 constitute a SCARA configuration to provide high stiffness in the vertical plane. A third link 22 is rotatably located at the end of second link 18 and is connected to a third motor 23 via a drive shaft 24, see FIG. 3. A forth link 25 is rotatably connected to a fourth motor 26 mounted on third link 22 via a drive shaft not shown. The links 22 and 25 along with motor 26 and drive shaft 27 constitute a SCARA configuration to provide high stiffness in the horizontal plane. A shaft 28 is secured in an end 29 or fourth link 25 and to which is attached an end affector 30 which may for example, comprise a device capable of picking up a lens or member 31 from base structure 11. While not shown, a fifth motor may be mounted in the fourth link 25 and connected to shaft 28 to provide rotation of the shaft and the end affector 30, thereby providing in addition another (fifth) degree of freedom. As indicated by the axis lines 32, 33, 34, and 35, the motors 16, 20, 23 and 26 may rotate links 14, 18, 22 and 25 in either direction as indicated by respective curved arrows 36, 37, 38 and 39. Thus, the FIG. 1 embodiment provides a SCARA in both the vertical and horizontal planes with kinematic redundancy. While not shown, appropriate bearings and bushings are provided for the rotating elements.

Figure 2:
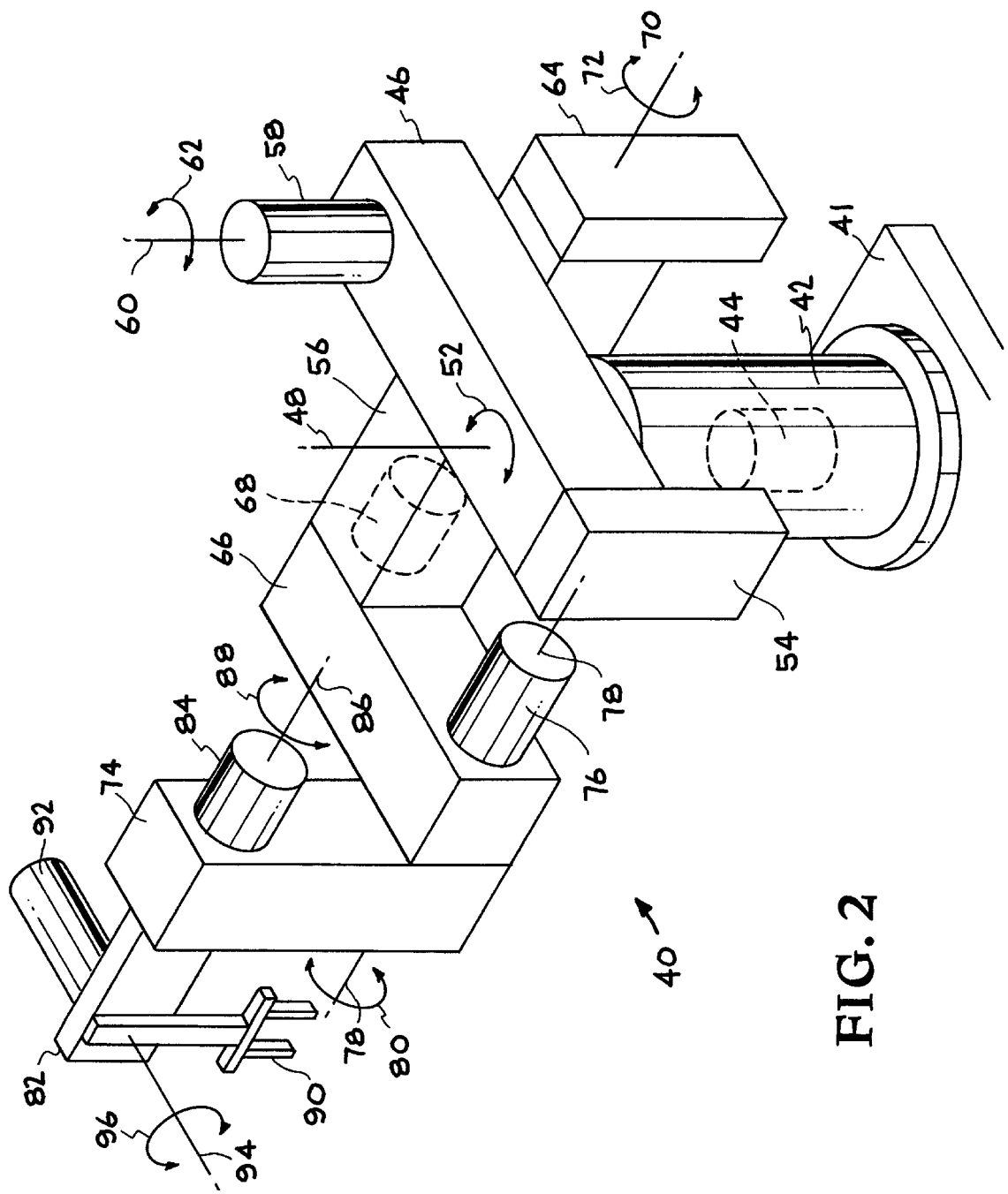
FIG. 2 is a perspective view of another embodiment of the invention involving seven degrees of freedom.

The seven degree of freedom embodiment illustrated in FIG. 2 provides a SCARA in both the vertical and horizontal planes as in the FIG. 1 embodiment, and additionally provides for pitch, yaw, and roll of the end effector by providing three additional degrees of freedom at the wrist of the manipulator.

Referring now to FIG. 2, the manipulator, generally indicated at 40, is mounted on a base structure 41 via a pillar or support member 42 which contains a buried motor 44 which rotates link 46 about an axis 48 as shown by curved arrow 52. Link 46 is provided with a balance counter weight 54. Link 56 is supported from link 46 and its motion is controlled by motor 58 mounted on link 46, with link 56 rotating about axis 60 as shown by curved arrow 62. Link 56 is also balanced by a counter weight 64. The assembly 46–48 define a SCARA in the vertical plane.

Link 66 is attached to link 56 and its motion is controlled by a motor 68 buried in link 56. Link 66 rotates about an axis 70 as shown by curved arrow 72. Link 74 mounted to link 66 has its motion controlled by motor 76 which rotates link 74 about an axis 78 as shown by curved arrow 80. The assembly 66–74 define a SCARA in the horizontal plane.

Link 82 mounted to link 74 is driven by motor 84 about an axis 86 as shown by curved arrow 88. An end effector or link 90, the final link in the series, is driven by motor 92 and rotates about an axis 94 as shown by curved arrow 96. The assembly 82–94 provide pitch, yaw, and roll to an end effector, not shown, connected to link 90.

Thus, the FIG. 2 embodiment provides a SCARA in both the vertical and horizontal planes, comprising four degrees of freedom, as well as an additional three degrees of freedom (pitch, yaw and roll) of the manipulator wrist. Appropriately located bushings and/or bearings, not shown, are provided to enable smooth rotation of the various components.

Figure 3:
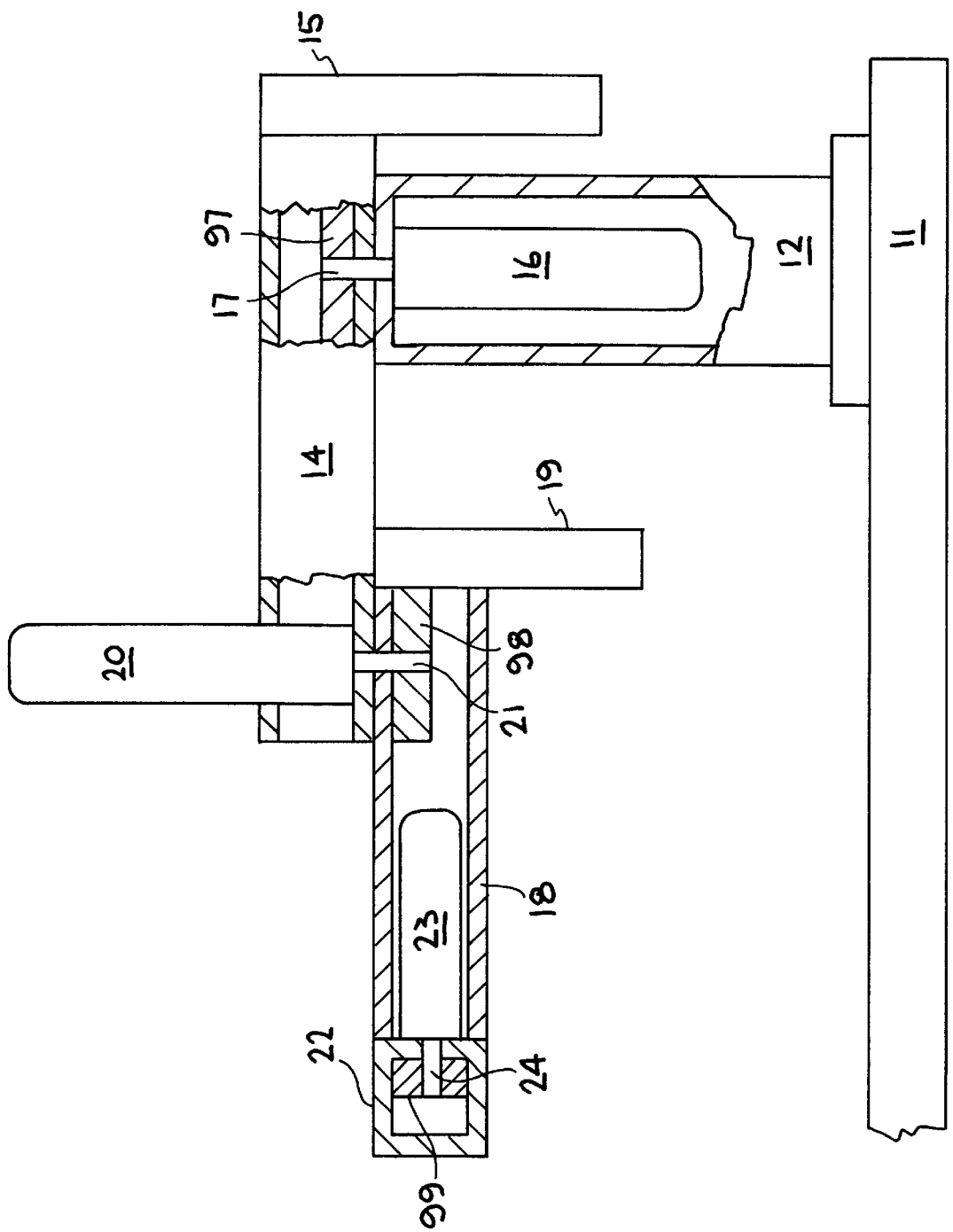
FIG. 3 is a partial cross-sectional view illustrating the motor/link connections.

FIG. 3 illustrates the interconnections of motors 16, 20 and 23 of FIG. 1 (or motors 44, 58 and 68 of FIG. 2) with their associated links. As shown in FIG. 3, motor 16 is connected to a plate 97 via drive shaft 17 which is secured in link 14. Similarly, motors 20 and 23 are connected by drive shafts 21 and 24 to plates 98 and 99 mounted in links 18 and 22, respectively. While not shown in FIG. 3, the drive shafts 17, 21 and 24 are provided with appropriate bushings or bearings mounted in pillar 12, and links 14, 18, 22 to enable smooth rotation of one link with respect to an adjacent link. The amount of weight is the counter balances 15 and 19 (54 and 64 in FIG. 2) is determined by the weight of the extending linkage structure and end effector.

It has thus been shown that the present invention provides a high precision redundant robotic manipulator for use in micro scale manufacturing automation. Kinematic redundancy of the manipulator enables operation in a highly congested work space, and the manipulator utilizes selective compliant assembly robot arms to provide high stiffness in both the horizontal and vertical planes. In addition, one embodiment provides an additional three degrees of freedom and enables pitch, yaw, and roll of the manipulated object. The invention enables part handling in opto-electronics device fabrication, an assistive device for medical surgery, as well as repeated operations such as placing an optical fiber in a hollow tube with precise orientation to ±10 microns repeatability.

While particular embodiments of the invention have been illustrated and described, such are not intended to be limiting. Modifications and changes may become apparent to those skilled in the art, and it is intended that the invention be limited only by the scope of the appended claims.

The invention claimed is:

1. A redundant robotic manipulator, including:
   a first pair of links mounted to rotate about a pair of spaced vertical axis lines and interconnected to form a first selective compliant assembly robot arm; and
   a second pair of links operatively mounted to rotate about a pair of spaced horizontal axis lines and mounted to one link of said first pair of links and interconnected to form a second selective compliant assembly robot arm.

2. The manipulator of claim 1, wherein said first selective compliant assembly robot arm provides stiffness in a vertical plane, and wherein said second selective compliant assembly robot arm provides stiffness in a horizontal plane.

3. The manipulator of claim 1, additionally including a support member to which another link of said first pair of links is operatively connected.

4. The manipulator of claim 1, wherein said first pair of links each include a counter weight.

5. The manipulator of claim 1, wherein each link of said first and second pair of links is provided with means for rotating said links.

6. The manipulator of claim 5, wherein the means for rotating said links comprises a motor operatively connected to said link.

7. The manipulator of claim 6, additionally including a support member, said motor for rotating another link of said first pair of links is mounted in said support member, said motor for rotating said one link of said first pair of links is mounted on said another link of said first pair of links, said motor for rotating a first link of said second pair of links being mounted in said one link of said first pair of links, and said motor for rotating a second link of said second pair of links being mounted on said first link of said second pair of links.

8. The manipulator of claim 7, additionally including a counter weight connected to at least each link of said first pair of links.

9. The manipulator of claim 1, additionally including means operative connected to a link of said second pair of links for providing pitch, yaw and roll of an associated object to be manipulated.

10. The manipulator of claim 9, wherein said means for providing pitch, yaw and roll includes a first link rotabably connected to an outer link of said second pair of links, means for rotating said first link a second link rotabably connected to said first link, and means for rotating said second link.

11. The manipulator of claim 10, wherein said means for rotating said first link includes a motor mounted on said outer link of said second pair of links, and wherein said means for rotating said second link includes a motor mounted on said first link.

12. The manipulator of claim 11, additionally including a support member to which another link of said first pair of links is rotatably mounted.

13. A mechanism for providing multiple degrees for freedom, including:

a support member;

a first pair of interconnected links mounted to rotate about a pair of vertical axis lines, one link of said first pair of links being rotatably mounted to said support member about a first of said pair of vertical axis lines;

a second pair of interconnected links, mounted to rotate about a pair of horizontal axis lines, one link of said second pair of links being rotatably mounted to another link of said first pair of links about a first of said pair of horizontal axis lines;

said first pair of links being constructed and connected to provide stiffness in a vertical plane;

said second pair of links being constructed and connected to provide stiffness in a horizontal plane; and means for rotating each link of said first and second pair of links.

14. The mechanism of claim 13, additionally including means connected to another link of said second pair of links for providing an additional three degrees of freedom.

15. The mechanism of claim 14, wherein said means for providing an additional three degrees of freedom including a first link rotatably mounted to said another link of said second pair of links, a second link rotatably mounted to said first link, and means for rotating said first and second links.

16. The mechanism of claim 15, wherein said means for rotating said first and second links comprise a pair of motors, each motor being connected to one of said first or second links.

17. The mechanism of claim 16, wherein said motor connected to said first link is mounted to said another link of said second pair of links, and wherein said motor connected to said second link is mounted to said first link.

18. The mechanism of claim 13, wherein four degrees of freedom are provided by said first and second pairs of links.

19. The mechanism of claim 14, wherein seven degrees of freedom are provided by said first and second pairs of links and said means connected to said another link of said second pair of links.

* * * * *